Patented Jan. 30, 1940

2,188,395

UNITED STATES PATENT OFFICE 2,188,395

LAMINATED SAFETY GLASS

Joseph D. Ryan and George B. Watkins, Toledo, Ohio, assignors to Libbey-Owens-Ford Glass Company, Toledo, Ohio, a corporation of Ohio No Drawing. Application June 13, 1934, Serial No. 730,464

7 Claims. (Cl. 49—92)

The present invention relates to laminated safety glass and more particularly to laminated safety glass involving the use of a cellulose aceto butyrate plastic sheet.

Laminated safety glass is a composited structure composed of two sheets of glass and an interposed layer of tough, transparent plastic material adherent to the inner surfaces thereof.

In the early development of laminated safety glass, pyroxylin plastic was usually, if not always, used as the plastic layer. However, due to the inherent instability of pyroxylin plastic toward heat and light energy, with consequent fairly short life of laminated safety glass made therewith, it became evident that improved plastics would have to be developed and the next stage was probably the development of a process permitting the use of cellulose acetate plastic.

Experience has shown that pyroxylin plastic can be more readily bonded to glass than most other plastics, and one of the difficult problems in the development of any improved plastics for use in the manufacture of laminated safety glass resides in the simultaneous development of a bonding material which can be used to give an adequate and satisfactory bond between said plastic and glass laminations.

Recently, a cellulose aceto butyrate plastic has been developed which gives promise of being even more satisfactory than present day cellulose acetate plastic. This cellulose aceto butyrate plastic might be termed in a general way a mixed ester of cellulose which is formed by esterifying cellulose with a mixture of acetic and butyric acids, thereby forming a triaceto butyrate of cellulose or cellulose triaceto butyrate.

The characteristics of the cellulose triaceto butyrate, with special reference to its high resistance to water absorption and a very low coefficient of thermal plasticity, coupled with the fact that it can be plasticized, made such plastic prominent as a possible substitute for both pyroxylin plastic and cellulose acetate plastic.

However, we discovered that because of its exceedingly low temperature coefficient of plasticity, such plastic could not be properly employed between two glass sheets using customary methods of bonding glass-plastic laminations.

The plastic was then further developed, particular attention being given to increasing its thermo plasticity, and accordingly the cellulose triaceto butyrate was subjected to a partial hydrolysis similar to the process used for making acetone soluble cellulose acetate from chloroform soluble cellulose acetate. After this partial hydrolysis, it was found that the resulting plastic sheets were sufficiently thermoplastic to permit molding between two plates or sheets of glass in customary laminating cycles wherein a pressure of 200 lbs. per square inch, and a temperature of 300° F. for a period of five to ten minutes is used.

After developing the plastic to this point, namely, to a point where it is capable of being molded under heat and pressure, it was found that the plastic could not be readily bonded between glass sheets. All attempts to bond the cellulose aceto butyrate plastic sheet to glass surfaces using the well known adhesives for bonding pyroxylin plastic and cellulose acetate plastics to sheets of glass failed to produce adhesion as did the application of various other materials such as, for example, natural and synthetic resins and various types and combinations of plasticizers commercially available.

Our invention resides in the development and discovery of a bonding material suitable for bonding or giving excellent adhesion between the cellulose aceto butyrate plastic and glass surfaces.

The method we use in preparing the adhesive consists in subjecting the raw cellulose derivative (aceto butyrate of cellulose) to a rather severe chemical treatment, which treatment seems to completely change the nature of the cellulose derivative as regards its adhesive characteristics to glass and yet the characteristics thereof resembles the cellulose aceto butyrate plastic sufficiently to give compatibility or adhesion between the adhesive and the plasticized sheet.

After subjecting the cellulose derivative to chemical treatment at elevated temperatures, the resulting cellulosic residue is carefully purified, dissolved and dispersed in proper solvents and plasticizers so that it can be applied in thin films to the glass surfaces by any of the well known means such as spraying, film applying rolls, etc.

The cellulose aceto butyrate plastic sheet is then assembled between the coated glass sheets, thus forming a sandwich, and the laminations bonded together by the application of heat and pressure. We have found a pressing cycle of 200 pounds per square inch at a temperature of 300° F. for a period of from five to ten minutes to be very effective in giving satisfactory bonding of the laminations.

We have found several different methods which have proven effective for chemically treating the raw aceto butyrate of cellulose in the manufacture of the new adhesive.

The raw, partially hydrolyzed triaceto butyrate of cellulose is preferably converted into a finely sub-divided condition before being subjected to chemical treatment. This was found necessary due to the dense, horny-like character of the raw, partially hydrolyzed triaceto butyrate of cellulose. To accomplish this sub-division, 400 grams of the partially hydrolyzed triaceto butyrate of cellulose was dissolved in 10 liters of acetone and the resulting dope poured, with vigorous stirring, into 18 gallons of cold water. The precipitate was washed on a filter until free of acetone and then dried.

*Example No. 1*

300 grams of the raw sub-divided partially hydrolyzed triaceto butyrate of cellulose was suspended, with stirring, in 10 gallons of water and heated to 200 to 212 degrees F. Then 100 grams of potassium permanganate was added and the mixture maintained just below the boiling point for about 3 hours. It has been noted that vigorous stirring of the reaction mixture is necessary for uniform results. At the end of the three hour period, the potassium permanganate is apparently completely reduced to manganate dioxide which must be removed, and this is preferably done by the use of reducing agents such as oxalic acid, sulfurous acid, etc., although it may be effected by a physical method with equally satisfactory results from the standpoint of the quality of adhesive produced. One physical method which was tried and found to give satisfaction involves filtering the reaction mass and drying. The reaction mass was then suspended in acetone (or other solvents) in which the manganese dioxide remains insoluble and then can be removed by filtration.

If the chemical method of removal of the suspended manganese dioxide is employed, after sufficient reducing agent has been added, the mixture in the reaction kettle is filtered, washed thoroughly, and dried.

An excellent adhesive for bonding the cellulose aceto butyrate plastic sheet to glass surfaces can then be made by dissolving the product of the chemical treatment in acetone or other suitable solvents to which may also be added plasticizers. If a spray liquid is desired, the chemically treated product is dissolved in acetone or other volatile solvents to which also may be added plasticizers, for example, diethyl phthalate, dimethyl phthalate, triethyl citrate, etc. However, we have found that good adhesion is obtained even when the plasticizers are not included.

If an adhesive is desired which can be applied by a rolling method, then the chemically treated product is dissolved in mixtures preferably of medium boiling solvents such as monoethyl ether of ethylene glycol, acetate of the monoethyl ether of ethylene glycol, monoethyl ether of diethylene glycol, etc. as well as plasticizers.

It was found by a long series of experiments that the amount of oxidizing agent could be varied and satisfactory adhesives could be obtained. Like other chemical reactions, the treatment was found to be dependent upon the time, concentration of reactants, etc. Other oxidizing agents, such as chromic acid, sodium dichromate in dilute acid solutions, potassium chlorate in dilute acid solutions, etc., were found satisfactory in carrying out chemical treatment.

*Example No. 2*

300 grams of the raw, partially hydrolyzed triaceto butyrate of cellulose was suspended in two gallons of water and 125 c. c. of concentrated hydrochloric acid added. The mixture is then heated, with vigorous stirring, to the boiling point and maintained at this temperature for a period of about 4 hours. At the end of this time, the mixture is filtered and the chemically treated product washed free of acid with water and then dried.

The dried product can then be dissolved in the proper solvents as outlined in connection with Example (1) above, dependent upon whether a spray or roll liquid is desired.

The chemical treatment can also be carried out using either phosphoric acid, sulfuric acid, nitric acid, or mixtures thereof, and also salts of strong acids and weak bases or acid salts like sodium bisulfate.

*Example No. 3*

300 grams of raw, partially hydrolyzed triaceto butyrate of cellulose is suspended in two gallons of 5% sodium hydroxide solution and the mixture heated to 200° F. for a period of two hours, at the end of which time the mixture is filtered, washed until free of alkali and then dried.

The dried product thus formed may then be dissolved in suitable solvents, either with or without plasticizers, and applied as an adhesive.

Other bases like potassium hydroxide, calcium hydroxide, and basic salts like sodium carbonate, can be used with equal satisfaction.

By way of example, it may be mentioned that an adhesive liquid particularly well adapted for application to the glass sheets by means of a roll film applying machine can be produced by mixing 30 parts by weight of the chemically treated, partially hydrolyzed cellulose aceto butyrate, 75 parts by weight of the acetate of ethyl ether of diethylene glycol, 50 parts by weight of the acetate of ethyl ether of ethylene glycol, 50 parts by weight of the ethyl ether of ethylene glycol, and 15 parts by weight of dimethyl phthalate.

A suitable spray mixture can be made by mixing 70 parts by weight of the chemically treated, partially hydrolyzed aceto butyrate of cellulose, 35 parts by weight of dimethyl phthalate, and sufficient acetone to give proper spraying consistency.

It will thus be seen that we have developed an adhesive for bonding cellulose aceto butyrate plastic to glass surfaces, which adhesive contains as the active ingredient percentages of the raw cellulose derivative having previously been chemically treated and then mixed with suitable solvents and plasticizers.

We claim:

1. Laminated safety glass comprising two sheets of glass and an interposed layer of tough, transparent, partially hydrolyzed cellulose mixed ester plastic, which in itself lacks adherence toward glass surfaces, bonded to said glass sheets with an adhesive formed from some of the same cellulose mixed ester as that comprising the plastic sheet and which has been further hydrolyzed to render it adherent toward glass surfaces.

2. Laminated safety glass comprising two sheets of glass and an interposed layer of tough, transparent, partially hydrolyzed cellulose mixed ester plastic, which in itself lacks adherence toward glass surfaces, bonded to said glass sheets with an adhesive formed from some of the same cellulose mixed ester as that comprising the plastic sheet and which has been further hydrolyzed and mixed with a plasticizer therefor.

3. Laminated safety glass comprising two sheets of glass and an interposed layer of tough, transparent, partially hydrolyzed cellulose aceto butyrate plastic bonded together with an adhesive formed from some of the same partially hydrolyzed cellulose aceto butyrate as that comprising the plastic layer and which has been further hydrolyzed.

4. Laminated safety glass comprising two sheets of glass and an interposed layer of tough, transparent, partially hydrolyzed cellulose aceto butyrate plastic bonded together with an adhesive formed from some of the same partially hydrolyzed cellulose aceto butyrate as that comprising the plastic layer and which has been further hydrolyzed and mixed with a plasticizer therefor.

5. Laminated safety glass comprising two sheets of glass and an interposed layer of tough, transparent, partially hydrolyzed cellulose aceto butyrate plastic, which in itself lacks adherence toward glass surfaces, bonded together with an adhesive formed from some of the same partially hydrolyzed cellulose aceto butyrate as that comprising the plastic layer and which has been further hydrolyzed to render it adherent toward glass surfaces while remaining compatible with said plastic layer.

6. The process of producing laminated safety glass comprising two sheets of glass and an interposed layer of tough, transparent, partially hydrolyzed cellulose mixed ester plastic lacking in adherence properties toward glass, including the steps of bonding said glass and plastic by means of an adhesive formed from some of the same cellulose mixed ester as that comprising the plastic layer and which has been further hydrolyzed to render it adherent toward glass surfaces under the combined action of heat and pressure.

7. The process of producing laminated safety glass comprising two sheets of glass and an interposed layer of tough, transparent, partially hydrolyzed cellulose mixed ester plastic lacking in adherence properties toward glass, consisting in bonding said glass and plastic by means of an adhesive formed from some of the same cellulose mixed ester as that comprising the plastic layer and which has been subjected to a treatment to further hydrolyze the same to render it adherent toward glass surfaces while remaining compatible with said plastic layer.

JOSEPH D. RYAN.
GEORGE B. WATKINS.